United States Patent
Antipa et al.

(10) Patent No.: US 10,284,639 B2
(45) Date of Patent: May 7, 2019

(54) SYNCHRONIZED VIEW ARCHITECTURE FOR EMBEDDED ENVIRONMENT

(71) Applicant: Adobe Systems Incorporated, San Jose, CA (US)

(72) Inventors: Damien Antipa, Saint-Louis (FR); Tobias Martin Bocanegra Alvarez, San Francisco, CA (US); Alexandre Capt, Landser (FR)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 14/524,208

(22) Filed: Oct. 27, 2014

(65) Prior Publication Data

US 2016/0119413 A1     Apr. 28, 2016

(51) Int. Cl.
*H04L 29/08* (2006.01)

(52) U.S. Cl.
CPC ........ *H04L 67/104* (2013.01); *H04L 67/1095* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 5,892,915 A * | 4/1999 | Duso | G11B 27/10 709/219 |
| 9,313,449 B2 | 4/2016 | Antipa et al. | |
| 2009/0019524 A1 * | 1/2009 | Fowler | H04L 9/3265 726/3 |
| 2012/0095853 A1 | 4/2012 | Von Bose et al. | |
| 2012/0114336 A1 * | 5/2012 | Kim | H04N 21/41415 398/106 |
| 2012/0226776 A1 * | 9/2012 | Keebler | G06F 17/30578 709/217 |
| 2012/0254773 A1 * | 10/2012 | Viswanathan | G06F 3/0483 715/753 |
| 2013/0141587 A1 | 6/2013 | Petricoin, Jr. | |
| 2013/0251329 A1 * | 9/2013 | McCoy | H04N 21/654 386/201 |
| 2014/0122644 A1 * | 5/2014 | Kuscher | H04L 29/08117 709/217 |

(Continued)

*Primary Examiner* — Kevin T Bates
*Assistant Examiner* — Lesa M Kennedy
(74) *Attorney, Agent, or Firm* — Kilpatrick Townsend & Stockton LLP

(57) ABSTRACT

Systems and methods for synchronizing information between devices are provided. An exemplary method receives, at first computing device, electronic content and data identifying one or more peer computing devices and establishes respective connections between the first device and each of the peer devices. The method sends, from the master device, to each of the peer devices, the content. When the content is received by the peer devices, at least a portion of the content is simultaneously displayed by the master device and the peer computing devices. In an embodiment, each of a group of devices at a location is configured to execute a player application within a browser in order to simultaneously display website content in a synchronized manner. One of the devices is referred to as a master device. The master device obtains current website content from a content repository and propagates the website content to the peer devices.

19 Claims, 8 Drawing Sheets

(56) References Cited

U.S. PATENT DOCUMENTS

2014/0129920 A1* 5/2014 Sheretov ........... G06F 17/30873
715/234
2015/0026125 A1* 1/2015 Sharma ............. G06F 17/30581
707/623

* cited by examiner

SYNCHRONIZED VIEW ARCHITECTURE FOR EMBEDDED ENVIRONMENT

TECHNICAL FIELD

This disclosure relates generally to computer-implemented methods and systems for exchanging information between devices, and more particularly relates to techniques for synchronizing electronic content between computing devices.

BACKGROUND

In an establishment with an open environment, such as a retail store or a conference room, there can be one or more electronic displays for displaying information to patrons, customers, guests, or other visitors. Such monitors can be mounted in locations that are readily visible, such as above entrances or aisles, near store shelves or product displays, on walls, or in other suitable locations. The displays can be included in embedded devices that are used for a variety of purposes, such as digital signage, advertising, and providing various other forms of information that may be of interest to the visitors. However, if the current content is not synchronized between devices in the environment, the displays may only be able to show outdated information to the visitors.

In certain environments, digital signage including images, web content, advertisements, and other electronic content, can be displayed on multiple screens that are physically close to each other. These screens can be in embedded devices that access common content. The screens can share the synchronized content, but not necessarily show the same portion of the content. The content can be pulled or pushed from a system or server, which is typically remote and not located in close proximity to the embedded devices and their screens. To achieve high levels of portability, screens of these embedded devices may be dedicated to displaying web content obtained from a remote web server or content repository. In traditional environments with embedded devices, the devices must each separately connect to a remote system (e.g., a server or a repository) in order to obtain content to be displayed. However, synchronizing content between the devices can require simultaneous access to and communication with the remote system. Additionally, synchronizing content between each of the devices within a given environment and the remote system can require relatively large amounts of communication between each of the devices and the remote system.

It is desirable to efficiently achieve real time and near-real time synchronization of content between devices without each of the devices having to access a remote system.

SUMMARY

In one embodiment, a method includes receiving, at a first computing device, electronic content and data identifying one or more peer computing devices. The method then establishes respective connections between the first computing device and each of the one or more peer computing devices. The embodiment includes sending, from the first computing device, to the one or more peer computing devices, the electronic content. When the electronic content is received by the one or more peer computing devices, at least a portion of the electronic content is simultaneously displayed by the first computing device and the one or more peer computing devices. The electronic content can be website content, including text, images, and multimedia content.

In another embodiment, a system has an input device, a display device, a processor, and a memory. The memory has instructions stored thereon that, if executed by the processor, cause the processor to perform operations for synchronizing content between computing devices. The operations include receiving electronic content and data identifying one or more peer computing devices and establishing respective connections between the system and each of the one or more peer computing devices. The operations further include sending, from the system, to the one or more peer computing devices, the electronic content. According to this embodiment, when the electronic content is received by the one or more peer computing devices, at least a portion of the electronic content is simultaneously displayed on the display device and by the one or more peer computing devices.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
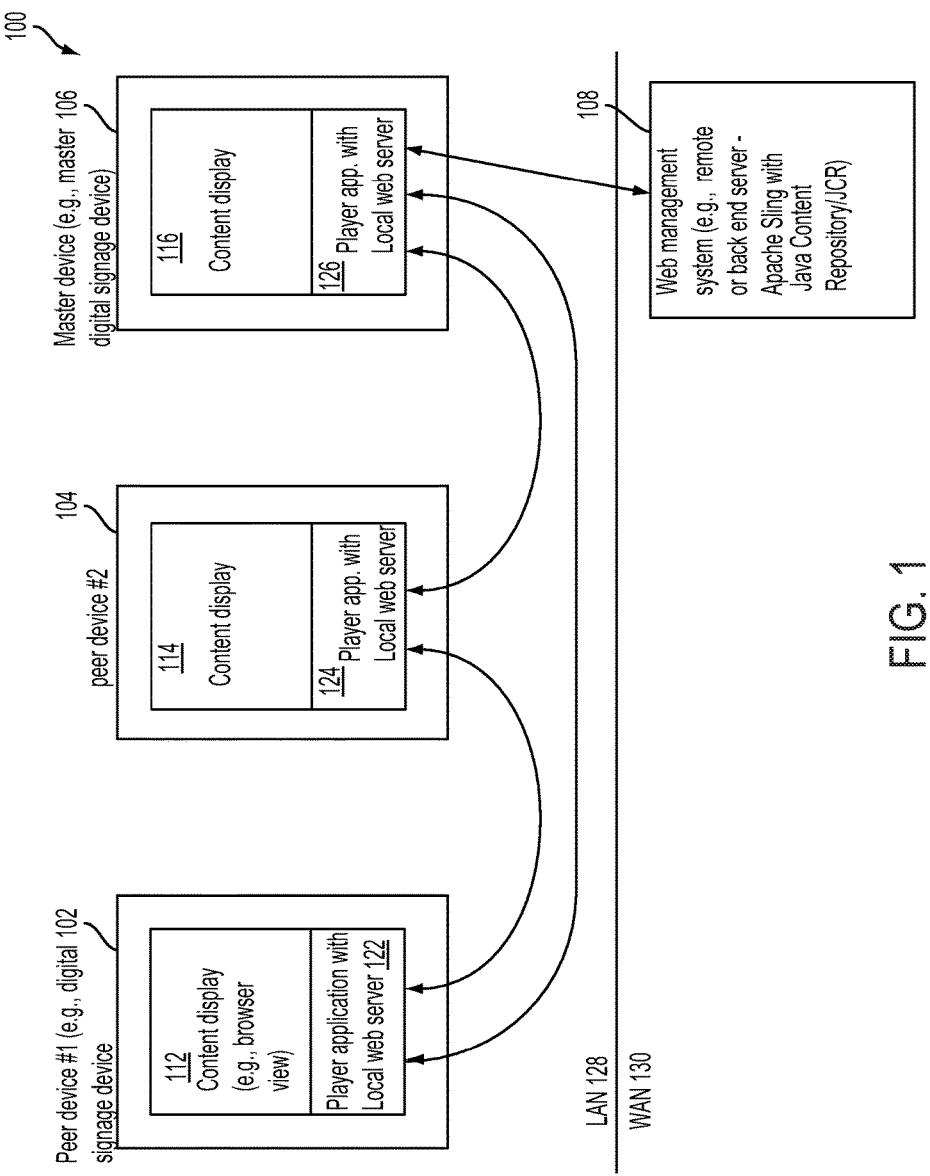
FIG. 1 is an architecture diagram for a content synchronization system in an embedded environment, in accordance with an embodiment of the present invention.

Embodiments provide an architecture including an embedded device connected to a screen via a video interface. In some embodiments, the embedded device has connections to input devices such as, for example, video cameras and touchscreens. The device can be attached to a local network, such as a local area network (LAN) or an Internet connection. In order to provide a cross screen experience with completely or partially synchronized views and cross screen interaction between the embedded device and other collocated devices, embodiments provide a mechanism to let the devices communicate with each other in a peer-to-peer mode. In an embodiment, the devices can provide a plain browser or an embedded browser environment using a browser such as, for example, Chromium, to run a web application. The web application, referred to herein a player application or player app, can be configured to communicate solely with a local host, such as a local web server on the same device that hosts the player application. In one embodiment, the communication between the player application and the local web server is over a Websocket connection. For instance, the Websocket connection can be a connection compliant with a World Wide Web Consortium (W3C) standard. In one example embodiment, the local host can be implemented as an embedded web server which provides a data backend. Since each of the devices at the location can include their own respective, local web server, the devices are also configured to communicate with each other. In certain embodiments, this communication between the devices (see, e.g., devices 102, 104, and 106 in FIG. 1) may be done through Websocket connections. That is, each local web server of devices at a location can communicate peer to peer with other local web servers via a local network.

By using the architecture and systems described herein, a master device and all peer devices are aware of the entire data set and contents which are visible on the screens of each of the devices. This data can be stored in memory and does not need to be saved or persisted on a remote system or server. For example, by storing synchronized web content in memory at a location, the content does not need to be saved at a remote web server such as a server used to implement the web management system 108 shown in FIG. 1.

When a visitor to an establishment views information and content displayed on embedded devices, embodiments enable the visitor to interact with the information so that it is customized or tailored for that visitor. This tailored information can then be synchronized between peer digital signage devices at the establishment, as well as being pushed to a remote system, such as a remote content repository or web server. Many establishments, such as retail stores and office buildings, have computing devices with network connectivity and web browsers or other applications for accessing and presenting information. These computing devices may be mobile or embedded devices installed in fixed locations (e.g., wall-mounted or installed in a kiosk) within a particular environment. When a user of a mobile device is in close proximity to one of the establishment's devices, or to another user's device, there is an opportunity for the devices to exchange information with each other wirelessly. In many such situations, the devices have no existing data connection, and therefore one must be established. A number of techniques for exchanging information wirelessly between devices exist, including a WiFi® network connection, an infrared (IR) signal transmission, and radio frequency identification (RFID) readers and transponders. However, these existing techniques can have several undesirable limitations. For instance, establishing respective WiFi® connections between a master device and each of a set of peer digital signage devices requires additional user configuration to establish each connection, and the network connection itself poses security concerns for the devices. Also, technologies like IR and RFID require specialized hardware and software that are not commonly installed on many consumer mobile devices (e.g., smart phones, tablet devices, portable gaming devices, etc.). Similarly, requiring each peer device at a location to individually synchronize content with a remote system such as a web management system, a remote web server, or a content delivery system, can require bandwidth intensive communications. These communications can delay delivery of content to peer devices, thus introducing lag times and preventing the devices from receiving the same, current version of content simultaneously. These and other limitations increase the difficulty of wirelessly synchronizing content between devices at a location.

To this end, and in accordance with embodiments, techniques are disclosed for exchanging and synchronizing information between devices. Each device is configured to execute a local web server, which can be included in a suitable player application for retrieving, displaying, synchronizing, and interacting with content. The devices can be digital signage devices as shown in FIG. 1, discussed below. One of the devices is referred to as a master device (e.g., master device 106 in FIG. 1), and other devices are referred to as the peer devices (e.g., devices 102 and 104 in FIG. 1). Although any device can act as a master, the master device synchronizes content between the local network and a remote system, server, or repository (e.g., web management system 108 in FIG. 1). The respective web browsers of the master and peer devices can each be configured to display, among other things, electronic assets and content, such as, for example, interactive web content, signage, and marketing content including offers and advertisements. A user of any of the master device or the peer devices can interact with and alter the content.

Example Use Cases

One example use case is as follows. A set of embedded devices each having their own respective screens in a retail store are set up to display offers and other dynamic content to visitors and customers in the store. The devices have input devices (e.g., touchscreen displays, keyboards, pointing devices, or other input devices) that the visitors and customers can use to provide input to the devices. A webpage is displayed on the screen. The web page includes a script (e.g., JavaScript) or other code configured to analyze input obtained via the embedded devices. When a customer enters input to interact with the web page at one of the embedded devices in the store, he can login to the store's web site (e.g., via a browser application rendering the webpage at the embedded device's screen). The input device captures the input and based on the input, determines if a content change is triggered. If the content has been changed, the devices can distribute the changed content to peer devices in the store, as well as a master device. The master device then notifies a web management system for the web page of the content change and uploads the changed data to a server or content repository associated with the web management system.

Another example use case is as follows. In a location such as a conference room, multiple device screens are displaying content of a virtual collaborative (e.g., multi-user) whiteboard website, where different documents can be displayed on the screens. Participants can then send documents to one or more of the screens (e.g., by broadcasting changes to peer device screens), or retrieve documents displayed on the screens of other participants so that content is synchronized between each participant's respective screen. Numerous other example use cases for browser-screen pairing and content synchronization will be apparent in light of this disclosure.

As used herein, a "computing device" refers to any type of computing device configured to communicate with another computing device over a network to access information, including mobile computing devices and other computing devices. A mobile computing device may allow mobility to the user during at least operation and may include, for example, a mobile phone, a smart phone, a personal digital assistant (PDA), a phablet, a tablet device, and other mobile computing devices. In comparison, other computing devices may be more stationary, may include relatively more processing power and memory space than those of mobile computing devices, and may have an operating system that is more sophisticated than operating systems typically running on mobile computing devices. A laptop, a personal computer, a desktop computer, and a server are examples of such other computing devices.

As used herein, "application" refers to a program configured to access and retrieve information hosted on a computing system (e.g., content from a web site hosted on a server, web management system, and/or a content delivery system) and to render the information at a user interface. Examples of such an application include a web browser, a player application (e.g., a player app), a script or a plug-in that runs within a web browser, a program that is hosted in a web browser, a program that is separate from but that interfaces with a web browser such as a player application, and other types of programs capable of using local memory and a rendering engine to access and render content.

As used herein, the term "web browser," refers to any application for retrieving, presenting and traversing information resources. Such information resources may be referenced via a Uniform Resource Identifier or Locator (URI/URL) and contain any type of content. Non-limiting examples of a web browser include Microsoft® Internet Explorer, Safari from Apple Inc., Mozilla Firefox, Opera, and Google® Chrome.

As used herein, the terms "electronic content", "content", "electronic assets", or "digital content" refer to any type of resource or media that can be rendered for display on computing devices. Electronic content can include text or multimedia files, such as images, video, audio, or any combination thereof. Electronic content can include digital signage content and website content. Electronic content can also include application software that is designed to perform one or more specific tasks at a computing system or computing device. Computing devices include client and server devices such as, but not limited to, servers, desktop computers, laptop computers, smart phones, video game consoles, smart televisions, tablet computers, portable gaming devices, personal digital assistants (PDAs), etc. Electronic content can be streamed to, replicated to, downloaded by, and/or uploaded from computing devices. Electronic content can include multimedia hosted on web sites, such as Internet web sites, intranet web sites, standard web pages, or mobile web pages specifically formatted for display on mobile computing devices. Electronic content can also include application software developed for computing devices that is designed to perform one or more specific tasks at the computing device.

Electronic content can be in the form of electronic content streamed from a server system to a client computing device. Streaming electronic content can include, for example, audiovisual content provided using a streaming protocol, such as, but not limited to, real time messaging protocol (RTMP), HTTP dynamic streaming (HDS), and HTTP Live Streaming (HLS).

As used herein, the terms "master device", "master computing device", and "master digital signage device" refer to any computing device configured to receive, display, and propagate or replicate electronic content to one or more peer devices. In an embodiment, a master device is configured to receive electronic content from a remote server, such as a web server or a database server of a content repository, and send the received content to peer devices. In accordance with an embodiment, a master device can also receive updated content from a peer device, and then replicate the updated content to other peer devices at a location as well as a remote server or web management system.

As used herein, the terms "peer device", "peer computing device", and "peer digital signage device" refer to any computing device configured to exchange electronic content with other peer devices and with a master device. In one embodiment, a master device and peer devices each have a display device (e.g., a screen) and each host a player application, a browser, and a local web server. According to this embodiment, the respective player applications are configured to provide a synchronized view of electronic content on their respective display devices. In some embodiments, a master device and one or more peer devices at a location can be embedded devices, such as, for example, kiosks, wall-mounted devices, or table-mounted devices at a location.

In an example embodiment, a master device can connect to a web management system, a content repository, or a content delivery system for content synchronization and retrieval purposes. For example, a master device can connect to a remote server of a web management system, a content repository, or a content delivery system for content synchronization to obtain content for websites or online services. The master device retrieves content from a website, which can be shown to the user on an electronic visual display (e.g., a connected/smart television, a conventional television, or computer display device, including a liquid crystal display (LCD) or a light emitting diode (LED) display) of the master device. The content can include images, video, audio, or code executable for rendering images, video and/or text on the display (e.g., JavaScript code). The content can include electronic assets, such as, for example, documents, graphics, advertisements, presentations, streaming content, HTML files, or any other form of data. The content, when displayed on the master device, can be simultaneously displayed on one more peer devices. In some cases, a communication is sent to a web management system to uniquely identify the master device. In some other cases, the web management system sends documents or other information associated with, or customized for, the master device or a user of the master device. Such content can be displayed on the screen of the master device, which in turn replicates the content to one or more peer devices. In an example, the master device and the peer devices can be digital signage devices. The digital signage devices can be embodied, for example, as embedded devices and/or mobile devices. The digital signage devices can be associated with a certain location, such as a conference room in a building, an area of a store, or a publicly accessible location.

Example Architecture and Systems

FIG. 1 illustrates an example architecture for a content synchronization system 100. The system can be implemented, for example, in an embedded environment. As shown, architecture includes one or more servers, a group of devices 102, 104, and 106. The group of servers can behave like a cluster. At any point in time, one of the devices, device 106, will act as a master. If the master device gets disconnected from system 100, another device (e.g., device 102 or 104) will take over the master role. This change can be conceptualized as a failover from master device 106 to another device (either 102 or 104) that automatically occurs in response to determining that master device 106 is unavailable. For example, in response to determining that the current master device 106 has been disconnected from local area network (LAN) 128 and/or wide area network (WAN) 130, automated failover to a new master device, either device 102 or 104, can be initiated. As illustrated in FIG. 1, devices 102, 104, and 106 can be digital signage devices. The master device 106 is responsible for accessing a data backend, such as web management system 108. In one embodiment, the master device 106 can be designated or selected by an administrator of web management system 108. For example, web management system 108 may send content to device 106 along with data indicating that device 106 is the master device and additional data identifying peer devices 102 and 104. As shown in the example of FIG. 1, web management system 108 can be embodied as an Apache Sling web framework for a Java platform. In one embodiment, the content repository can be accessed via the Content Repository API for Java (JCR) specification.

As used herein, the terms "JCR repository" and "JCR" are used interchangeably to refer to a content repository that is compliant with the JCR specification. In embodiments, a JCR repository is compliant with a specification developed under the Java Community Process via a Java Specification Request (JSR). In certain embodiments, a JCR repository compliant with the JSR-170 specification can be used as a content repository for content to be synchronized, including web page components, images, text, forms data, and metadata. An exemplary JCR repository can be implemented as an object database including a tree of nodes having associated properties. One example of a JCR repository is the Adobe® Content Repository Extreme (CRX) Enterprise Content Management (ECM) platform. The JCR repository can be implemented within a composite content applications platform configured to natively manage content in the JCR repository. The JCR repository can include a web application framework based on Representational State Transfer (REST) principles (i.e., a RESTful web application framework). Another exemplary JCR repository is the Apache Jackrabbit content repository for Java platforms. According to embodiments, as content is created and modified, it can be added to the content repository.

As shown in FIG. 1, web management system 108 can be located off-site, remote from LAN 128, peer devices 102, 104, and master device 106. The communications between web management system 108 and master device 106 can be via an HTTP connection to a REST endpoint.

Figure 2:
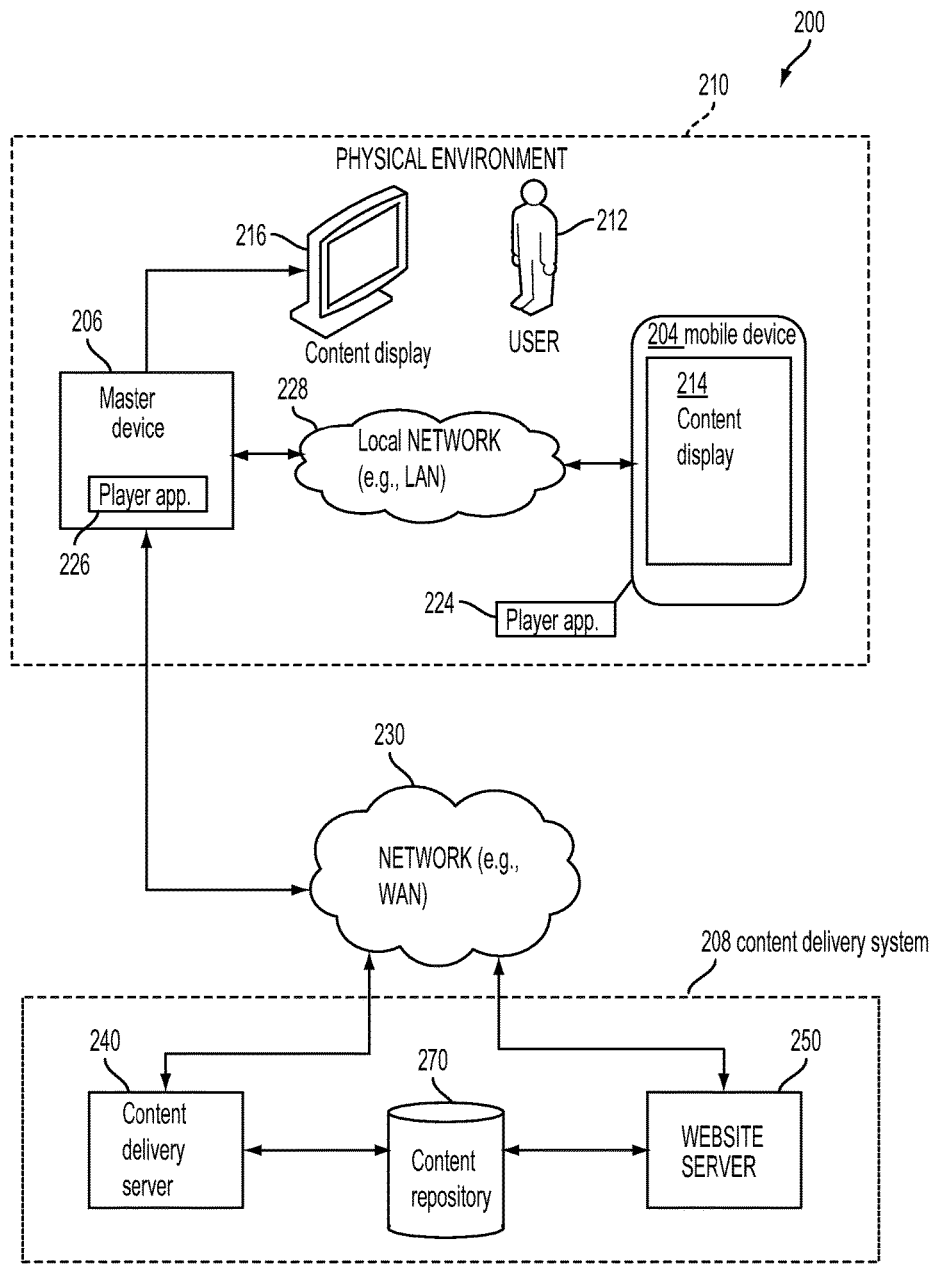
FIG. 2 illustrates an example client-server system for exchanging and synchronizing information between different types of devices, in accordance with an embodiment of the present invention.

The web management system 108 can be implemented as part of a content management system providing an administrator/authoring user interface (UI), a staging area for content, and publishing of activated web pages. Examples of an administrator UI are discussed below with reference to FIGS. 4 and 5. In one example embodiment, a content management system such as Adobe® Experience Manager (formerly Adobe® CQ) can be used as the web management system 108. The web management system 108 can maintain sets of assets for a promotional or marketing campaign to be displayed by peer devices 102, 104, and master device 106. In some embodiments, web management system 108 can be implemented as a content delivery system. Example components of such a content synchronization system are illustrated in FIG. 2, which is discussed below.

The master device 106 can receive data from the web management system 108. The data can include like electronic assets, web content such as HTML documents, images, video, et al. to be displayed by the player application 126. The master device 106 is configured to transport information which needs to be persisted on web management system 108 to the data endpoint.

With continued reference to FIG. 1, a data flow example within content synchronization system 100 is described below. In an example, content display 112 of device 102 can be embodied as a touch sensitive display device which allows a visitor to enter his personal data using an on-screen keyboard or other input device. At this point, device 102 will distribute this data to devices 104 and 106. This distribution can be carried out using a broadcast in LAN 128 or using Websocket connections established between devices 102, 104 and master device 106. Since device 106 is the master, it is configured to send this information to the data backend, web management system 108. After master device 106 sends the information to web management system 108, master device 106 informs devices 102 and 104 to remove the form data associated with the personal data from their respective memories because it has been synchronized and is no longer used.

According to embodiments, one or more of the following techniques can be used to present choices to a visitor or user of devices 102, 104, and 106. The first technique is a list view. The list view can be used when system 100 is deployed in environments such as, for example, a conference room, a museum, a store, or other environments with fixed, mounted positions of screens. It is to be understood that in addition to mounted, embedded devices, embodiments can also synchronize content to mobile screens, such as for example, a tablet device associated with a conference room, a smartphone in use in the room, and/or tethered devices such as those used to demonstrate mobile devices in stores. The list view technique can be used to provide product information via embedded and tethered devices in environments such as car showrooms, and installations at venues for conferences and sporting events.

Another technique involves use of a floor map whereby a user can select content, or a version of content, for different digital signage devices located at different rooms and locations (e.g., different walls) of a floor/story of a building. For example, a floor map can be used to select content to be displayed at devices, both embedded and mobile, that are associated with a conference room on a certain floor of a building.

Yet another technique uses geolocation with an interactive map that shows actual locations of digital signage devices and their respective screens. In one embodiment of the geolocation technique, a web-enabled interactive map can be used, such as, for example, a Google map available from Google Inc.

Figure 5:
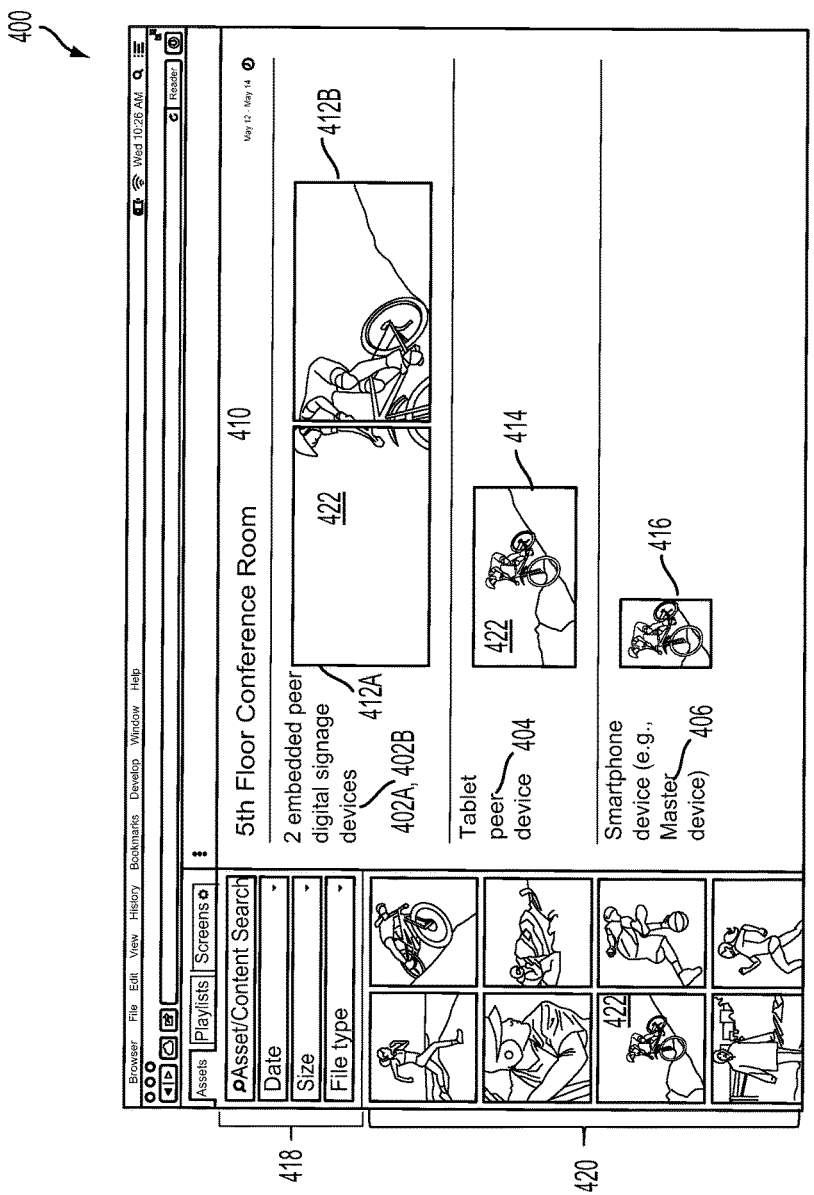
Figure 6:
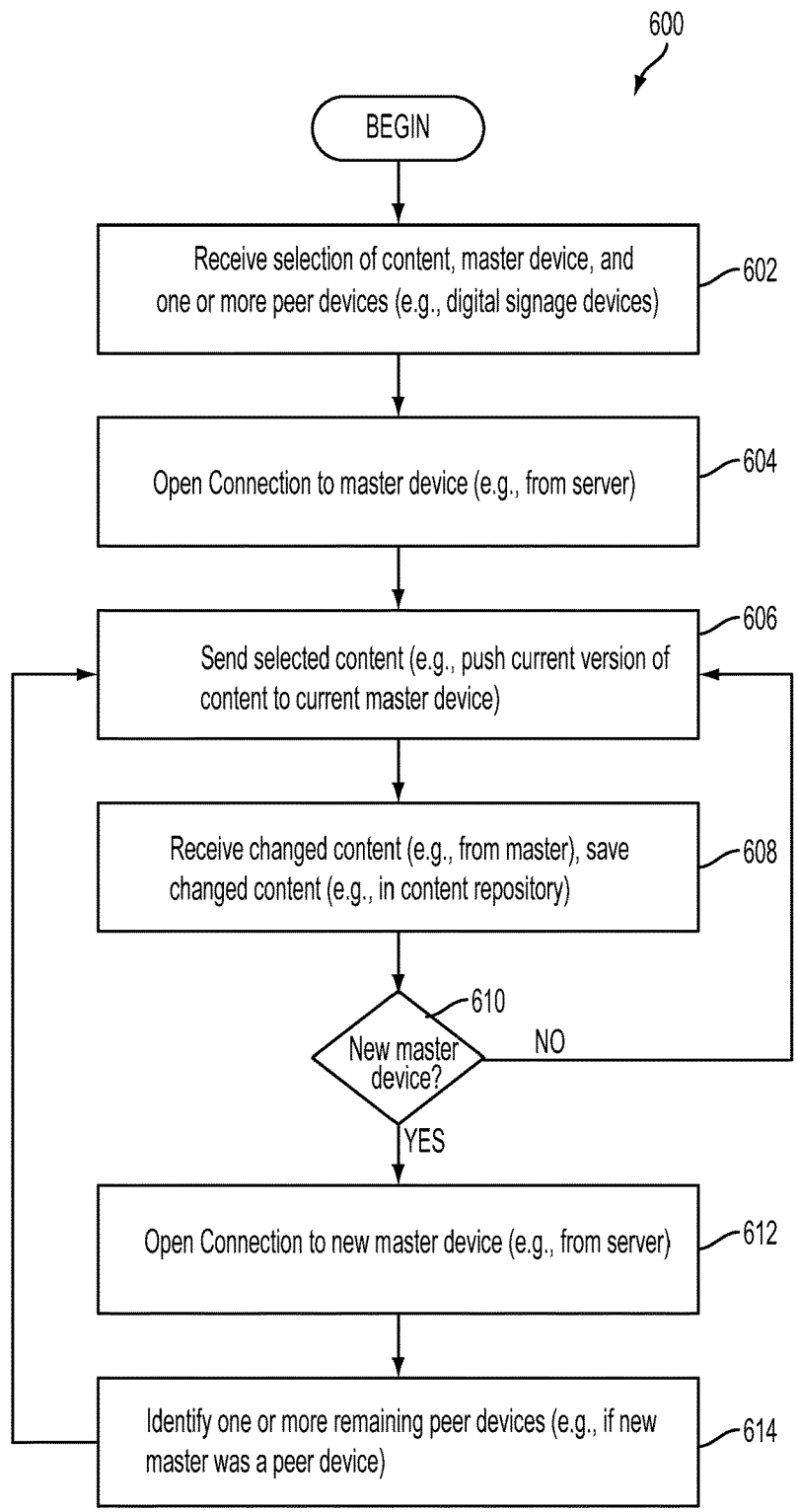
FIG. 6 is a flowchart illustrating an exemplary method for synchronizing information between devices, in accordance with an embodiment of the present invention.

FIGS. 5 and 6, which are described below, illustrate example system administrator interfaces for using the list view, floor map, and geolocation techniques to select content for different devices, including both embedded and mobile devices.

In an embodiment, peer devices 102, 104, and master device 106 each comprise one or more components, such as, but not limited to, an input device configured to interact with browser-based UI of a player application such as player application 122, a touch screen display device configured to render a content view, such as the content display 112. An exemplary peer device 102 can include, without limitation, an Internet Protocol (IP)-based (i.e., IPTV) set top box (STB). Embodiments are not limited to this exemplary peer device 102 interfacing with a local area network (LAN) 128, and it would be apparent to those skilled in the art that other content navigation and display devices can be used in embodiments described herein as peer devices, digital signage devices, and a master device, including, but not limited to, personal computers, mobile devices such as smart phones, laptops, tablet computing devices, or other devices suitable for rendering content on a display such as content display 112. Many additional devices can be used with content synchronization system 100, although only three devices 102, 104, 106 are illustrated in FIG. 1. In an embodiment, a digital signage device may be integrated with a content display 112, so that the two form a single, integrated component. For example, digital signage devices 102, 104, and master digital signage device 106 can include any suitable computing devices for communicating via LAN 128 and/or WAN 130, rendering a user interface (UI), and/or executing player application (e.g., player application 122).

As shown in FIG. 1, each of the peer devices 102, 104, and master device 106 are communicatively coupled to each other through LAN 128. The currently designated master, e.g., master device 106, is communicatively coupled to web management system 108 through a wide area network (WAN) 130. Although not depicted in FIG. 1, in an alternative embodiment, a content repository can be located separately from web management system 108. Peer devices 102, 104, and master device 106 can receive operational commands from users via respective input devices. The input devices can include, for example touchscreen displays. In the example of FIG. 1, content displays 112, 114, and 116 can be implemented using touch sensitive display devices (i.e., touchscreen displays). The operational commands can include commands to initiate navigation and/or editing of content via a player application. For example, commands to navigate to, select, view, and modify content a player application 122 can be received at content display 112 of digital signage device 102. An external keyboard, pointing device, remote control (not shown), or other input device may be used to control operation of devices 102, 104, 106. Some embedded digital signage devices may have integrated input devices or controls thereon not requiring the use of an external input device. For example, digital signage device 104 can be embodied as a kiosk wherein content display 114 is an embedded display within the kiosk and player application 124 executes on one or more processors housed within the kiosk.

It is to be appreciated that the web management system 108 could provide any type of audio/visual content. Content playing, viewing, and interaction as described herein refers to any use of content that is, generally, available for delivery to an individual digital signage device. Content delivery to a given digital signage device can be initiated upon an explicit push from a master device or as a pull in response to a an explicit request from that digital signage device. Web management system 108 may also be referred to as a "server" herein. As part of a content viewing session, web management system 108 may provide a version of content stored in a content repository or remotely at a web server.

According to an embodiment, content synchronization system 100 displays an administrator UI (shown in FIGS. 4 and 5) including a UI for selecting content and versions of content to be displayed on different types of devices (e.g., digital signage devices, TVs, and mobile devices). In embodiments, content display 112 may be one or more of a television, a network-enabled television, a monitor, the display of a tablet device, the display of a laptop, the display of a mobile phone, or the display of a personal computer. In an embodiment, peer device 102 includes a cable set top box (STB) connected to content display 112. In this embodiment, content display 112 may be a television or monitor connected to the STB of peer device 102.

Web management system 108 can provide different versions of selected content via the WAN 130. These versions can include content matched to a type of content display device associated with a particular player application or devices. In embodiments, a particular one of versions of content can optionally be selected by an administrator, where the selection is based in part on characteristics of a particular device 102, 104, 106 where the version of content is to be viewed. The version of content provided to a digital signage device may be resident in any suitable computer-readable medium, database, and/or memory, accessible by a player application hosted on that digital signage device. In one embodiment, a particular one of the versions is provided in a resolution compatible with a particular content display 112 of digital signage device 102 that the content is to be viewed on. In one embodiment, the various versions of the content (e.g., different versions of image data) can be accessed by the web management system 108 from a remote location via WAN 130 and provided to the digital signage devices 102, 104, and master digital signage device 106. Each of the versions can include a copy of some or all of the content encoded at a given bit rate and/or bit size appropriate for the destination digital signage device.

Web management system 108 can include any suitable computing system for hosting and delivering content. As shown in FIG. 1, web management system 108 can include a backend server that is remote from digital signage devices 102, 104, 106. In one embodiment, web management system 108 may be a single computing system. In another embodiment, web management system 108 may be a virtual server implemented using multiple computing systems or servers connected in a grid or cloud computing topology. As described below with reference to FIG. 10, web management system can be implemented on a computing system having a single processor in a multi-core/multiprocessor system. Such a system can be configured to operate alone with a single back end server, or in a cluster of computing devices operating in a cluster or server farm used to implement web management system 108.

WAN 130 may be a data communications network such as the Internet or any wide area network (WAN). LAN 128 may be any local area network (LAN) suitable for synchronizing data between peer devices 102 and 104 and master device 106. In embodiments, LAN 128 and/or WAN 130 can be one of or a combination of a cable network such as Hybrid Fiber Coax, Fiber To The Home, Data Over Cable Service Interface Specification (DOCSIS), Internet, WiFi®, ATM or any other wired or wireless network. Web management system 108 may store and deliver content including but not limited to streaming online video, in-store advertising, online conference content, television programs, television broadcasts/simulcasts, movie previews, movies, and video game previews. Certain types of delivered content can be interactive and can be modified at digital signage devices. For example, a moderator and one or more other participants in an online conference may be able to use content synchronization system 100 for online collaboration by modifying online conference content that conference attendees are viewing. By using content synchronization system 100, each conference attendee will have simultaneous or near-simultaneous access to modified conference content.

Digital signage devices 102, 104, and master digital signage device 106 can establish respective network connections via LAN 128 with each other. The current master digital signage device, e.g., master device 106, also establishes a network connection with web management system 108 via WAN 130. One or more of player application (e.g., player applications 122, 124, 126) can be executed at digital signage devices 102, 104, and 106, respectively, to establish network connections via LAN 128 to peer digital signage devices. The network connections can be used to synchronize content by communicating packetized data representing the content between the digital signage devices. As shown in FIG. 1, content can be synchronized between master device 106 and web management system 108 via WAN 130. For example, using a connection via WAN 130, bidirectional communications between master device 106 and web management system 108 can provide one or more updates to content to web management system 108 and/or master digital signage device 106. Such content changes can be replicated in response to changes made at either of digital signage devices 102 and 104 or master device 106, as well as updates available from web management system 108 that are provided to master device 106.

For example, digital signage device 102 can provide a change to content made in player application 122. This changed content can be provided via LAN 128 to master device 106. At this point, master device, via WAN 130, can upload the changed content web management system 108. In the context of web content, this can be accomplished using an HTTP post request to a web server of web management system 108. According to this embodiment, a web communication such as an HTTP post request is sent to the web server to notify the server that the master device has content data that needs to be persisted in web management system 108. The master device provides the content to web management system 108 and requests that web management system 108 persist (i.e., save) the data in its content repository. Conversely, web management system 108 can deliver new or updated content to master device 106. Delivery can be performed using web sockets, and the content can be delivered in a form usable by player application 126. For example content from web management system 108 can be sent to master device 106 via WAN 130 as packetized data. At this point, the player application on master device 106 (e.g., player application 126) can configure a processor of the master device 106 to render the content for display on content display 314. The master device 106 will also simultaneously synchronize the content delivered by web management system 108 to peer digital signage devices 102 and 104 via network connections in LAN 128. In this way, content synchronization system 100 synchronizes content between digital signage devices 102 and 104 as well as master device 106 without requiring each of these devices to establish their own separate connections to web management system 108 via WAN 130.

In an embodiment, if the current master fails, another one of digital signage devices 102, 104 take the master role. After a new master device is designated, the new master device will take on responsibility to be the master device. In certain embodiments, the new master device can then request or pull content from web management system 108. In additional or alternative embodiments, the new master device can send a communications via WAN 130 informing the web management system 108 of the device's current role as the new master device.

In response to receiving a request from a current master digital signage device (e.g., master device 106), web management system 108 can determine a quality level for a version of content to be rendered by player application (e.g., player application 126). In certain embodiments, properties of the current master digital signage device or another peer digital signage device can be used by web management system 108 to select a version of content appropriate for the master device. For example, if a particular digital signage device is a mobile device, content displayable on the mobile device's display (i.e., the mobile device's content display) can be provided to the digital signage device. Also, for example, in response to determining that a requesting digital signage device is located in a given geographic location or region, or physical location (e.g., based on a Global Positioning System (GPS) location of the digital signage device, a media access control (MAC) address of the digital signage device, a network address of the digital signage device, or other identifying information), web management system 108 can provide a version of the content deemed appropriate for the determined location. In the embodiments provided in FIGS. 4 and 5, an administrator UI can be used to select versions of content such as image versions, to be displayed in certain locations (e.g., in a particular conference room of a building) and/or at particular times (e.g., in the conference room during an online conference commencing at a given time). Web management system 108 can also determine an ideal quality level for content based at least in part on determining current communication capabilities, network connectivity (e.g., download speed), and/or a hardware profile of a destination digital signage device. In some embodiments, master device 106 can determine quality levels and/or versions of content to be propagated to peer digital signage devices 102 and 104.

FIG. 2 illustrates an example client-server system 200 for exchanging and synchronizing information between devices, in accordance with an embodiment. The client-server system 200 depicted in FIG. 2 is described with reference to the embodiments of FIG. 1. However, client-server system 200 is not limited to those example embodiments. At least a portion of the system 200 can operate within a physical environment 210, such as a retail store, office, conference room, lobby, transportation depot, library, restaurant, park, or any other space in which a user 212 is in proximity to at least some components of the system 200, as will be described in further detail below. The system 200 includes a master device 206, one or more peer devices 204, and one or more servers, such as a content delivery server 240 and a website server 250, each electronically interconnected.

As seen in FIG. 2, master device 206 and peer device 204 are communicatively connected via a local network 228 (e.g., a local area network/LAN), and master device and content delivery system 208 are connected to each other via a network 230 (e.g., a wide area network/WAN, such as the Internet). Generally, the master device 206 and the peer device 204 can be any type of device, such as a personal computer (PC), tablet, or smart phone, configured to access and provide content (e.g., a web page, a word processing document, a fixed layout document, etc.) provisioned by the servers 240, 250 or another content-providing server of content delivery system 208. The master device 206 can be embodied as an embedded digital signage device including a content display 216 for displaying, among other things, content rendered by player application 226. The display 216 can also be used to display any other type of human-readable content. The display 216 can include any electronic visual display device (e.g., a conventional television or computer monitor, including a liquid crystal display (LCD) or a light emitting diode (LED) display). In some cases, the display 216 can be physically integrated into the master digital signage device 206 (e.g., such as found in an information kiosk or on a conventional smartphone). The peer device 204 can be a mobile device having an integrated content display 214. As would be readily apparent to one of ordinary skill in the art, such a mobile device can include input devices such as buttons and a camera (not shown). The camera can be any device configured to detect light and form an image so as to, for example. The content display 214 can include any electronic visual display device (e.g., a conventional television or computer monitor, including a liquid crystal display (LCD) or a light emitting diode (LED) display).

By way of example, the master device 206 can be a smartphone (e.g., an iPhone® from Apple Inc., a device running an Android operating system, a BlackBerry® device from Research In Motion/RIM, a Windows® phone, etc.), an iPad® from Apple Inc., or other suitable mobile computing device. That is, the master device 206 can be a mobile computing device operating one of a variety of mobile operating systems and platforms, such as the iOS operating system (OS) developed by Apple Inc., the Android platform from Google Inc., the Microsoft Windows® Phone OS, the Blackberry OS from RIM and similar operating systems providing wireless communications capabilities.

By way of further example, the peer device 204 can include a personal computer or other suitable computing device, such as a desktop device. As will be appreciated in view of this disclosure, neither the master device 206 nor the peer device 204 do not necessarily need to be mobile by design; however, if the master device 206 is mobile, the content display 216 may be physically integrated into the master device, instead of being a dedicated, separate display as shown in the non-limiting example of FIG. 2. Alternatively, as shown in the example of FIG. 2, the peer device 204 can be a mobile device, where the content display 214 is physically integrated into the peer device (e.g., the peer device may be a smartphone). It will be understood that the functions of the computing devices variously described in this disclosure can be performed on and by any number of computing devices, depending on the particular application of the system. For instance, one or more of the devices 204, 206 can each include a respective player application 224 and 226. The player applications can each include their own web browser or another application suitable for retrieving, processing, displaying and interacting with content provisioned by an content delivery server 240, a website server 250, or any combination of these or other servers. Data representing the content can be stored in a content repository 270. Content repository 270 can be implemented using one or more databases or other storage devices accessible by the servers 240 and 250.

Content stored in the content repository 270 can be uniquely identified by an address, metadata, filename, version identifier, or other identifying information. Non-limiting examples of such identifying information include a version number, a serial number, a document file name/location (e.g., a URL), a numeric value, an access code, a text string, instructions that can be executed by a processor (e.g., 'retrieve content x from database y'), or any other data usable to identify and retrieve the content.

Figure 3:
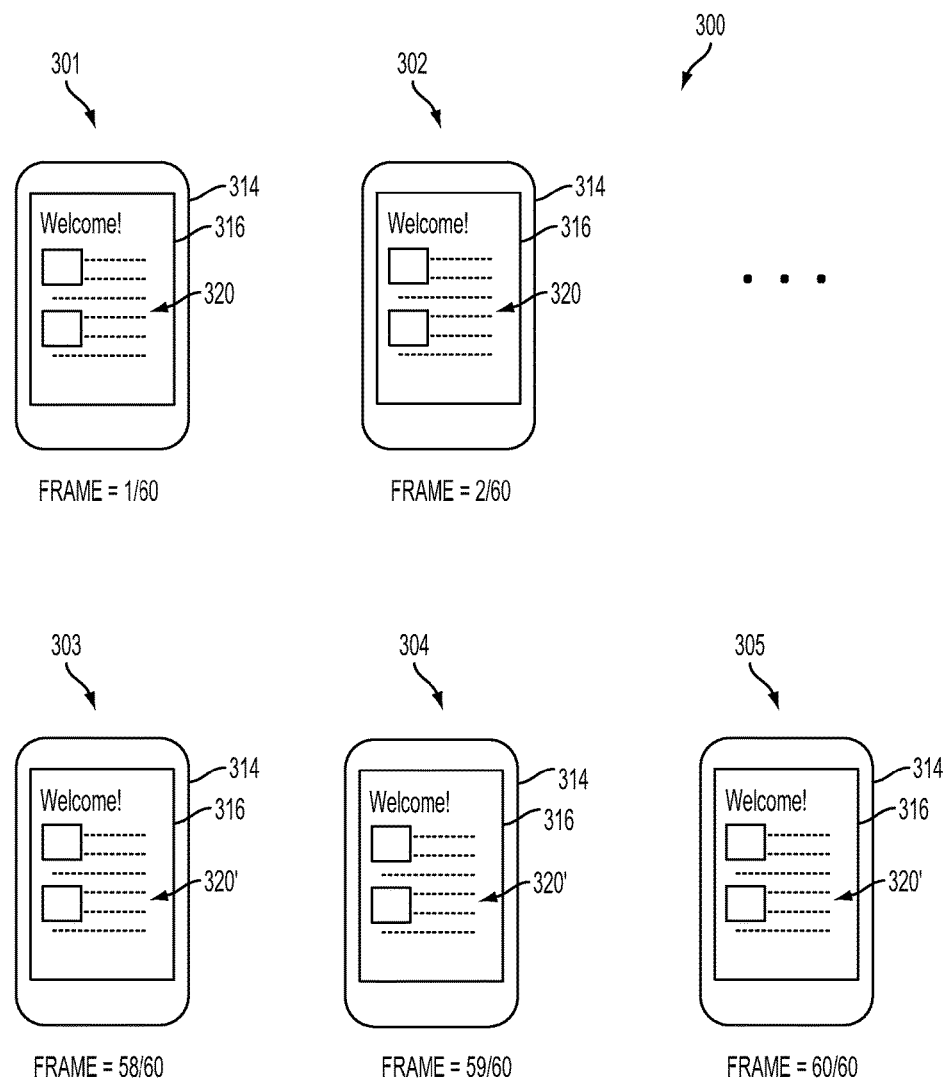
FIG. 3 depicts an example sequence of video frames that can be synchronized between devices at a given frame rate, in accordance with an embodiment of the present invention.

FIG. 3 depicts an example sequence for displaying synchronized content that includes video content. In particular, FIG. 3 depicts a set of video frames 300 that can be displayed at a given frame rate by a digital signage device 314, in accordance with an embodiment of the present invention. The display sequence depicted in FIG. 3 is described with reference to the embodiments of FIGS. 1 and 2. However, the display sequence is not limited to those example embodiments. In use, the digital signage device 314 can be either a peer device or a master device configured to connect to a website, login, and receive web page content 320. The digital signage device 314 can be configured to display the web page content 320 on its content display 316, such as indicated at 301 in FIG. 3. In the non-limiting example of FIG. 3, the digital signage device 314 is a mobile computing device with an integrated content display 316.

As shown, digital signage device 314 is further configured to update the content display 316 at a particular frame rate. Most standard display devices have a frame rate of 60 frames per second. However an appropriate function, provided by the player application and its operating environment can be used to manipulate the rendering in a single frame. For example, in a browser environment, this can usually be achieved by using the requestAnimationFrame method to tell the browser that the player wishes to perform an animation and request that the browser call a function to update the animation (e.g., a succession of frames). An example succession of frames is indicated at 301 and 302 in FIG. 3. Additionally, the digital signage device 314 can be configured to receive the updates to the video content at any point during the display of frames 300. The updates can be received as updated video content 320' from a peer device, a master device (e.g., when device 314 is not currently the master device), or a content delivery system 208 (e.g., when device 314 is the master device). In accordance with embodiments, the updated video content 320' is display at device 314 and at any peer devices and/or a master device in a synchronized manner. In this way, the frames of video content displayed on content display 316 of device 314 will be synchronized with frames of the content shown on other devices at the location. This succession of frames of updated content 320' is indicated, for example, at 303, 304, and 305 in FIG. 3.

In cases where the video frames 300 cannot be shown completely in synchronization across multiple devices at a location (e.g., due to communication or processing lag times), frames 300 are shown close enough in time so that any difference in synchronization cannot be visual perceived by a human user 212. For instance, since the human eye cannot perceive more than approximately 24 frames per second, it is possible to display frames 300 that are out of synch by such a small, negligible amount of time (e.g., for $\frac{1}{60}$th of a second) that the lack of complete, real-time synchronization is imperceptible to a user 212 when viewing the content display 314 with the naked eye as compared to viewing the same frames 300 on another content display at the user's location. In this manner, the user 212 can interact normally with the web content 320 (or updated content 320') even while the frames 300 displayed may be out of synch by an imperceptible amount. Although only a single digital signage device 314 is shown in FIG. 3, it is to be understood that by using content synchronization systems 100 and 200 described above with reference to FIGS. 1 and 2, the video frames 300 shown in FIG. 3 can be synchronized between multiple computing devices. For example, video frames 300 can be displayed in a synchronized manner on digital signage device 314 while also being displayed substantially simultaneously on one or more of master device 206 and/or peer device 204 of FIG. 2.

Example Administrator Interface

Figure 4:
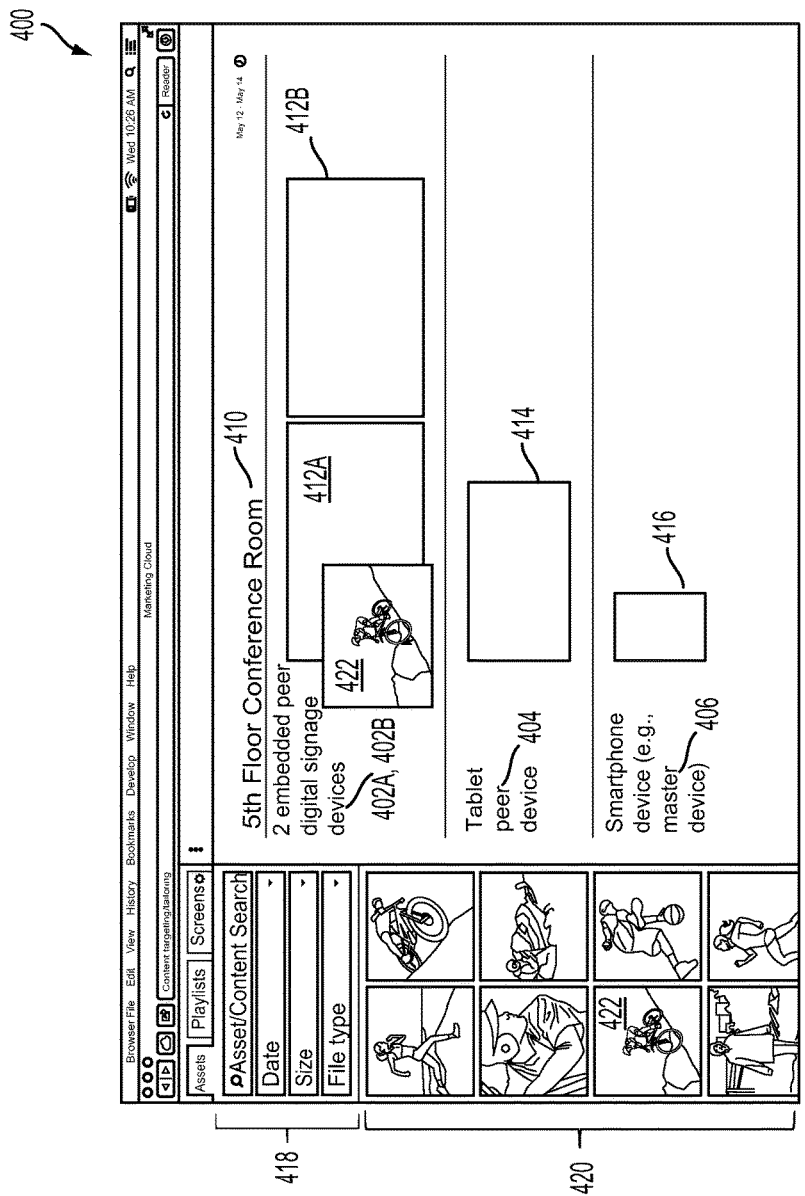
FIGS. 4 and 5 illustrate an interactive administrator interface for selecting content and images to be displayed on devices, in accordance with various embodiments.

FIGS. 4 and 5 depict an administrator user interface. The user interface (UI) 400 depicted in FIGS. 4 and 5 is described with reference to the embodiments of FIGS. 1 and 2. However, the UI is not limited to those example embodiments. In one embodiment, the UI is displayed on the master device 106 using content display 116. In additional or alternative embodiments, the UI can be displayed on display devices of other computing devices, such as computing devices connected to the web management system 108 via WAN network 130. For ease of explanation, the content targeting operations discussed in FIGS. 4 and 5 are in the context of a client application executing on a computing device with a display device 19. However, the content targeting and authoring operations are not intended to be limited to the exemplary devices and platforms shown in FIG. 1. It is to be understood that the user interface illustrated in the exemplary embodiment of FIGS. 4 and 5 can be readily adapted to execute on displays of a variety of computing device platforms running a variety of operating systems that support an interactive user interface.

Throughout FIGS. 4 and 5, displays are shown with various icons, buttons, links, command regions, windows, toolbars, menus, and drop down lists that are used to initiate action, invoke routines, search for content assets, select content, select display targets (e.g., screens), simulate display of selected content on target screens, or invoke other functionality. The initiated actions include, but are not limited to, selecting an asset or content to be displayed, targeting a screen of a device, and other content synchronization administrative actions. For brevity, only the differences occurring within the figures, as compared to previous or subsequent ones of the figures, are described below.

The interface depicted in FIGS. 4 and 5 can be used by an administrator to select content, such as, but not limited to marketing images or advertising content and target specific versions of the content to be shown on content displays associated with a given location. As shown in FIG. 4, an existing image 422 in a set of content assets 420 can be located and selected using the asset search menu 418 of UI 400. Different instances or versions of the image 422 can be selected and targeted for display at a selected location 410. In the example of FIGS. 4 and 5 the location 410 is a conference room (e.g., "5$^{th}$ floor conference room") of a building. The exemplary administrator UI 400 can be launched in response to determining that a content is be selected and displayed at location 410. The exemplary UI 400 of FIGS. 4 and 5 includes a list view that an administrator can use to select content 420, such as a specific image 422 to be pushed from a content repository of web management system 108 or content delivery system 208 to content displays 412A, 412B, 414, and 416.

As shown in FIGS. 4 and 5, content displays 412A, 412B, 414, and 416 correspond to displays of different types of peer devices and a current master device. In the example of FIGS. 4 and 5, content displays 412A and 412B are associated with a pair of embedded digital signage devices 402A and 402B in conference room/location 410. In an embodiment, content displays 412A and 412B digital signage devices 402A and 402B are adjacent to each other. FIGS. 4 and 5 also show that content displays 414 and 416 are associated with a tablet peer device 404 and a smartphone master device 406, respectively. The administrator UI 400 of FIGS. 4 and 5 enable an administrator user to preview how the selected image 422 can be displayed on various content displays that are associated with location 410 (e.g., a conference room). Within UI 400, an administrator can find content 420 using asset search menu 418, select image 422, and drag and drop the selected image 422 to target devices 402A, 402B, 404, and/or 406 at location 410. UI 400 can be used to send content to devices 402A, 402B, 404, and 406 along with data indicating that device 406 is the master device. That is, UI 400 can be used to designate a master device and send data to the master device 406 additional data identifying peer devices 402A, 402B, and 404.

FIG. 5 shows that the selected image 422 is split across multiple screens (e.g., two screens, content displays 412A and 412B). This can be done using web browsers of digital signage devices 402A and 402B. This can be accomplished by using player applications of digital signage devices 402A and 402B to load a respective browser on each screen that shows the same selected image 422, but shifts image 422 so as to show different areas of image 422. In this way, the same content (e.g., image 422) can be shown on content displays 412A and 412B, but UI 400 can be used to control how different portions are shown on content displays 412A and 412B. In this way, UI 400 can be used in conjunction with player applications and web browsers installed on digital signage devices 402A and 402B to carry out a synchronized display into different portions (e.g., different halves) of image 422. For example, location 410 can include additional digital signage devices 402C and/or 402D (not shown), and UI 400 can be used to select which portions (e.g., different thirds or quarters) of image 422 will be shown on respective ones of the digital signage devices 402A-D. In one example, digital signage devices 402A and 402B can be implemented as smart or connected televisions having browser capabilities.

By using UI 400 in conjunction with content synchronization system 100, embodiments do not have to rely on providing synchronization instructions to dedicated hardware such as separate graphics cards to drive each of content display screens 412A and 412B. This is because each of digital signage devices 402A and 402B are aware of the multiple screens at location 410. This embodiment reduces hardware costs by not requiring use of dedicated or specialized hardware to drive or control each screen at a given location.

With continued reference to FIG. 5, a simulation of a synchronized display of the image 422 can be shown for each device 402A, 402B, 404, and 406 at the location 410. In an embodiment, UI 400 can be used to simulate and/or select different versions of image 422 to be displayed on devices 402A, 402B, 404, and 406. As seen in FIG. 5, devices 402A, 402B, 404, and 406 can have different size displays (expressed in terms of height and length in pixels) and/or displays with different resolutions. In such cases, UI 400 can be used to target different versions of image 422 for display on content displays 402A, 402B, 414 and 416 in accordance with the respective display capabilities of those displays. By using UI 400, an administrator user can also change some content 420, publish the changed content, and then an embodiment includes a mechanism so that each of devices 402A, 402B, 404 and 406 gets the changed content. In particular, master device 406 can get the changed content from content repository 270 of content delivery system 208, as well as being informed that the changed content needs to be replicated to peer devices 402A, 402B, and 404. Master device 406 can then broadcast the changed content to peer devices 402A, 402B, and 404 via a local network so that the peer devices can obtain and display the changed content without having to individually connect to content delivery system 208. In this example, the broadcast and synchronization of changed content can be triggered by a user of UI 400.

Example Methods

FIG. 6 is a flow chart illustrating an example server-side method 600 for synchronizing information between devices, in accordance with an embodiment. The example method 600 may, for example, be implemented by the web management system 108 of FIG. 1 or the content delivery system 208 of FIG. 2.

The method 600 starts at 602 by receiving a selection of content, a selection of a master device, and a selection identifying one or more peer devices. As shown in FIG. 6, the peer devices can be digital signage devices. For example, when an administrator of the web management system publishes content to be pushed or otherwise delivered to a location, it can select that content, identify a master device at the location that is to receive the content, and perform the remaining steps of method 600 to send that master device the content along with data identifying one or more the peer devices at that location.

The master device can be a device configured to retrieve or receive the selected content from a content repository for a website. The selections can be made, for example, using the UI 400 of FIGS. 4 and 5. The selection can identify a master device, such as, for example, the master device 106 of FIG. 1 in addition to identifying one or more peer devices 104, 106.

Next, at 604, the method 600 further includes opening a connection to the master device, which in some cases may be a data connection via a WAN such as the Internet. The connection can be established by a server, such as the content delivery server 240 of FIG. 1, based on the selection of the master device received at 602. This can be achieved, in some embodiments, by establishing a data connection between a server of a web management system and the device selected as the master device. The connection may, for example, be established using Websockets, long polling, Ajax (Asynchronous JavaScript and XML), or other suitable techniques.

The method 600 continues at 606 by sending the selected content and other data identifying the peer device(s) from the web management system. This can include, in some embodiments, retrieving a current version of the selected content from a content repository and pushing the current version of the content to the master device. For example, when an administrator of the web management system publishes content to be pushed or otherwise delivered to a location, it can send that content to an identified master device at the location that is to receive the content.

Then, at 608, changed content can be received. As shown, this can be updated content received from the master device. Step 608 can include saving change content that is to be persisted in the content repository.

Next, at 610 a determination is made as to whether a new master device exists. This may be determined in response to losing a connection with the previous master device and/or receiving a connection request from a different master device at a location. If it is determined that there is a new master device, control is passed to step 612 where a connection is established with the new master device. Otherwise, control is passed back to step 606.

After a connection is established with the new master device at 612, at 614 one or more peer devices are identified for the location. As shown, different peer devices may be identified in step 614 if the new master device had previously been acting as a peer device. At this point control is passed back to step 606 where the current content is sent (e.g., to the current master). At this point, the content can be displayed on the master device's screen, such as content display 116 of FIG. 1. As explained below with reference to FIG. 7, as the content is displayed on the master device, it is simultaneously replicated from the master device to the identified peer devices. The method 600 can repeat one or more of steps 606-614 to continue to receive additional content or updated content indefinitely, propagating any changed content to the master device, which in turn can broadcast the changed content to identified the peer devices. For example, the method 600 may be used to synchronize server-side images and web content stored in a content repository to a master device that displays the content as well as sending the content to other, peer digital signage devices. That is, method 600 can be used to synchronize content sent to the master device from a web management system or a content delivery system.

Figure 7:
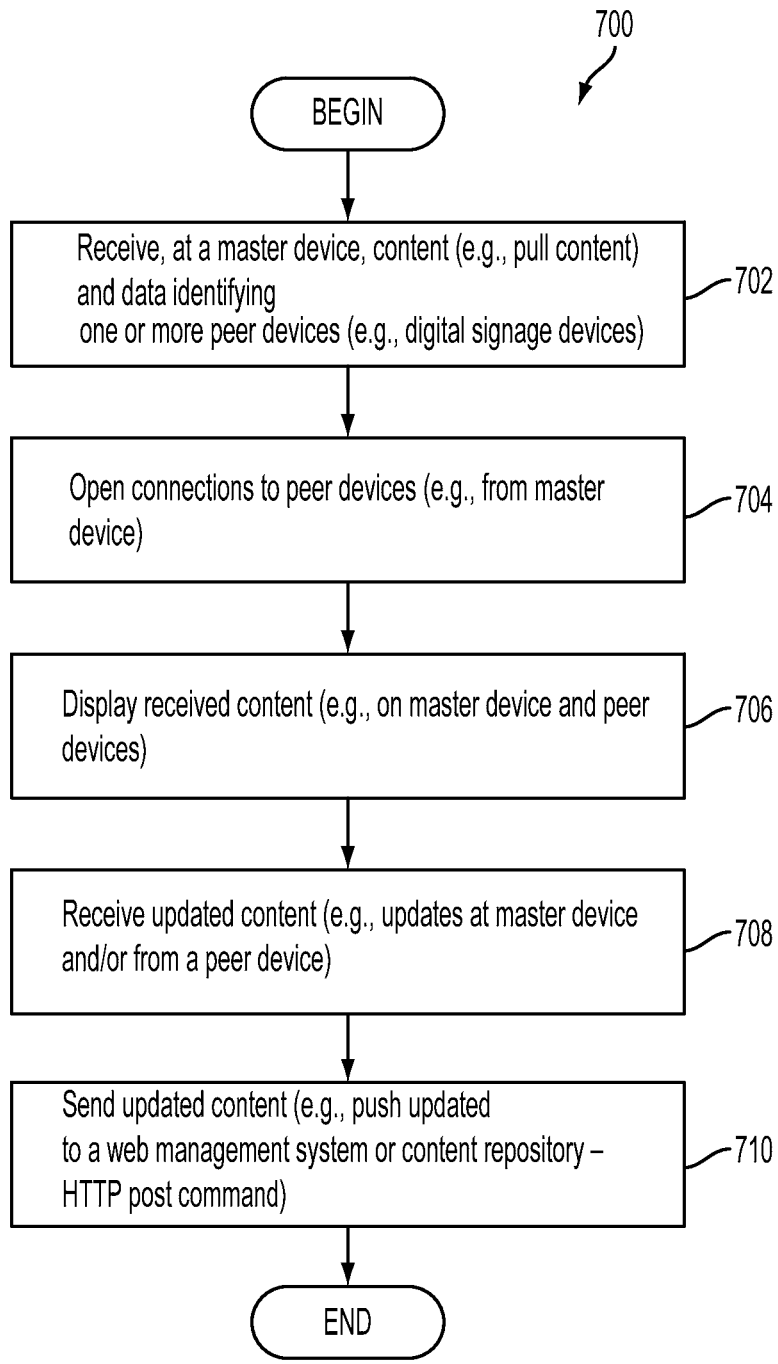
FIG. 7 is a flowchart illustrating another exemplary method for synchronizing information between devices, in accordance with an embodiment of the present invention.

FIG. 7 is a flow diagram of an example client-side method 700 for synchronizing information between devices, such as embedded devices at a location, in accordance with embodiments. The example method 700 may, for example, be implemented by the player application 126 of the master device 106 of FIG. 1.

The method 700 begins at 702 by receiving, at a master device, content (e.g., pulling website content) and data identifying one or more peer devices. As shown in FIG. 7, the data can identify one or more peer digital signage devices. The content and data received at 702 can be received by a current master device (either a previously selected master device, or a new master device that a synchronization system has failed over to after the previously selected master device is offline, disconnected from a network, or otherwise unavailable).

Next, in step 704, method 700 opens connections to peer devices (e.g., from the master device). Then, at 706, the received content is displayed. The content can be, for example, website content from a web management system. The content may include software that when executed by a processor of the master device 106, causes the content to be displayed on a screen of the master device (e.g., content display 116 of FIG. 1).

As part of 706, the method 700 includes pushing the content to peer devices, which in turn display the content on their respective content displays. In this manner, a user of the master device 106 can view and interact with the content while users of peer digital signage devices 102 and 104 also view and interact with the content. As part of 706, the method broadcasts the content received by the master device to peer devices, which in turn display the content on their screens (e.g., content displays 112, 114 of FIG. 1).

Next, at 708, updated content is received. As shown, the updated content can include updates from user interaction or input at the master device, and/or updated content received at the master device from a peer device. After updated content is received at the master device, control is passed to 710 where the updated content is transmitted. As depicted in FIG. 7, step 710 can comprise sending the updated content from the master device as a push to a web management system or content repository. For example, an HTTP post command can be used to send updated data to a web server of the web management system and notify the web management system that the updated data need to be saved (e.g., persisted) by the web management system.

Exemplary Computer System Implementation

Figure 8:
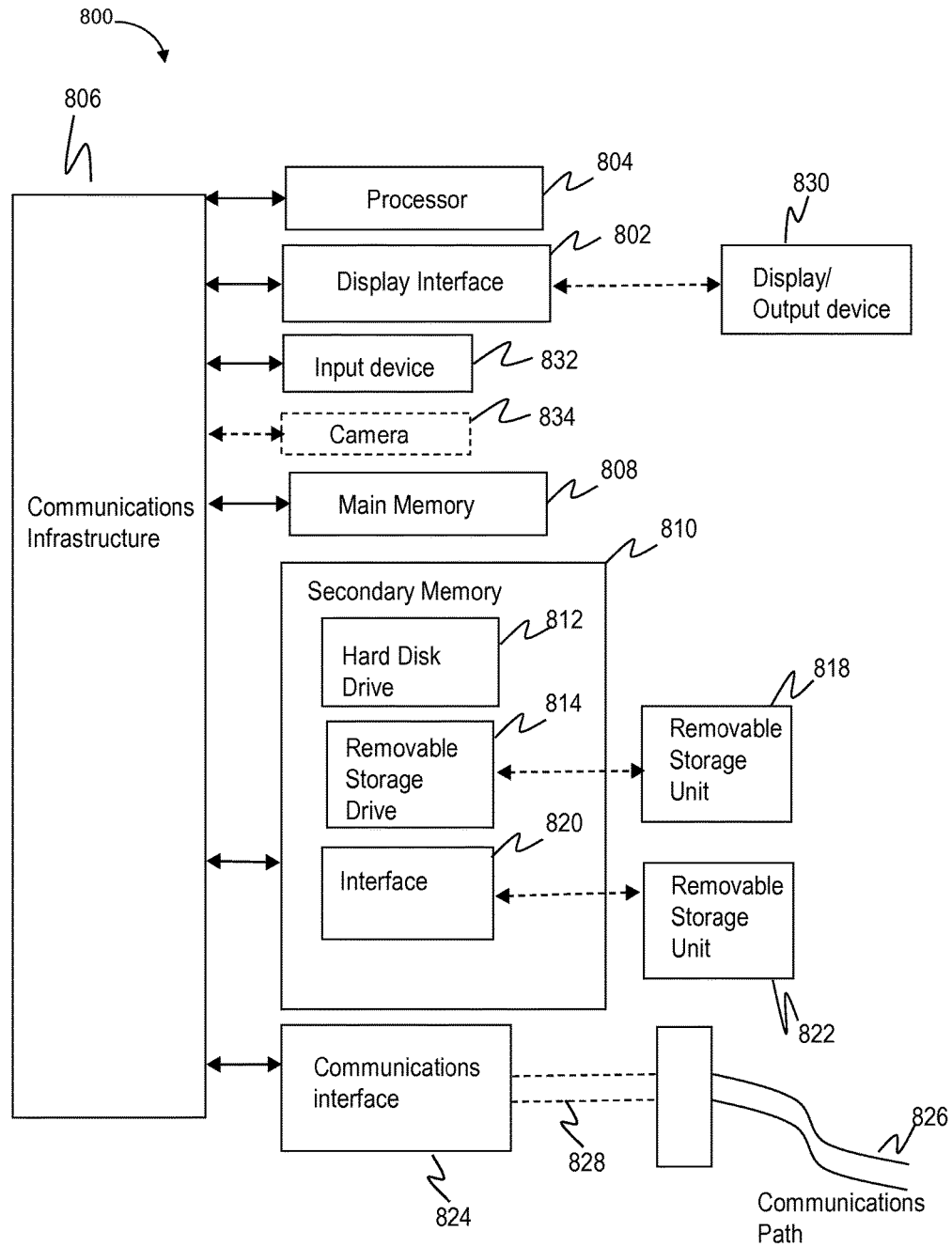
FIG. 8 is a diagram of an exemplary computer system in which embodiments of the present disclosure can be implemented.

Although exemplary embodiments have been described in terms of apparatuses, systems, services, and methods, it is contemplated that certain functionality described herein may be implemented in software on microprocessors, such as a microprocessor chip included in computing devices such as the computer system 800 illustrated in FIG. 8. In various embodiments, one or more of the functions of the various components may be implemented in software that controls a computing device, such as computer system 800, which is described below with reference to FIG. 8.

To implement the various features and functions described above, some or all elements of the computing devices (e.g., computing devices 102, 104, 106, 204, 206, and 314) and servers (e.g., servers 240 and 250) may be implemented using elements of the computer system of FIG. 8. More particularly, FIG. 8 illustrates an example computer system 800 for implementing the techniques in accordance with the present disclosure.

Aspects of the present invention shown in FIGS. 1-7, or any part(s) or function(s) thereof, may be implemented using hardware, software modules, firmware, tangible computer readable media having logic or instructions stored thereon, or a combination thereof and may be implemented in one or more computer systems or other processing systems.

FIG. 8 illustrates an example computer system 800 in which embodiments of the present invention, or portions thereof, may be implemented as computer-readable instructions or code. For example, some functionality performed by the computing devices 102, 104, 106, 204, 206 and 314 and servers 240 and 250 shown in FIGS. 1-3 can be implemented in the computer system 800 using hardware, software, firmware, non-transitory computer readable media having instructions stored thereon, or a combination thereof and may be implemented in one or more computer systems or other processing systems. Hardware, software, or any combination of such may embody certain modules and components used to implement the systems 100 and 200 illustrated by FIGS. 1 and 2 discussed above. Similarly, hardware, software, or any combination of such may embody certain modules and components used to implement steps in the flowcharts illustrated by FIGS. 6 and 7 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme. In certain embodiments, a processor of one or more of the computing devices 102, 104, 106, 204, 206 and 314 and servers 240 and 250 described above with reference to FIGS. 1-3 can be embodied as the processor device 804 shown in FIG. 8.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. In non-limiting embodiments, one or more of the memories of computing devices 102, 104, 106, 204, 206 and 314 and servers 240 and 250 of FIGS. 1-3 can be embodied as the main memory 808 shown in FIG. 8.

The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a non-transitory computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or EEPROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 808 and secondary memory 810, which can be memory semiconductors (e.g., DRAMs, etc.). Computer readable medium and non-transitory computer readable medium can also refer to removable storage unit 818, removable storage unit 822, and a hard disk installed in hard disk drive 812. Signals carried over communications path 826 can also embody the logic described herein. These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the steps in the methods illustrated by the flowcharts of FIGS. 6 and 7, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

In an embodiment, displays 112, 114, 116, 214, 216, and 316 used to display interfaces of peer devices 102, 104, 204, and 31 and master devices 106 and 206 may be a computer display 830 shown in FIG. 8. The computer display 830 of computer system 800 can be implemented as a touch sensitive display (i.e., a touch screen). The computer display 830 can connect to communications infrastructure via display interface 802 to display received electronic content. For example, the computer display 830 can be used to display synchronized content such as content of a collaborative conferencing session including a video component, a shared desktop interface, and a chat window. Also, for example, computer display 830 can be used to display the administrator UI 400 shown in FIGS. 4 and 5. As shown in FIG. 8, computer system 800 can also include an input device 832 and optionally include a camera 834.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
    establishing (i) a first connection between a master web server executing on a master computing device and a web management system across a first data network, (ii) a second connection between the master web server and a first web server executing on a first peer computing device across a second data network, and (iii) a third connection between the master web server and a second web server executing on a second peer computing device across the second data network, wherein the first peer computing device and the second peer computing device are not connected to the first data network;
    receiving, over the first data network, at the master web server, and from a web management system, a plurality of versions of electronic content;
    selecting, at the master web server, from the plurality of versions of electronic content and based on network conditions of the first data network or the second data network, a version of electronic content;
    transmitting, over the second data network, from the master web server to the first web server and the second web server, the version of electronic content, wherein, when the version of electronic content is received by the first web server, the version of electronic content is simultaneously displayed by: (i) a master application executing on the master computing device, wherein the master application queries the master web server, (ii) a first application executing on the first peer computing device, wherein the first application queries the first web server, and (iii) a second application executing on the second peer computing device, wherein the second application queries the second web server; and
    responsive to determining, at the master web server, that a user operating the first application has created a modified version of electronic content stored on the first web server:
        receiving, over the second data network, at the master web server, the modified version of electronic content from the first web server,
        transmitting, over the second data network, from the master web server to the second web server, the modified version of electronic content, and
        transmitting, over the first data network, from the master web server, to the web management system, the modified version of electronic content.

2. The method of claim 1, wherein the version of electronic content includes website content and wherein receiving the version of electronic content comprises pulling, by the master web server, the version of electronic content from the web management system.

3. The method of claim 1, further comprising one or more of (i) rendering, by the first application, the version of electronic content on a first digital signage device or (ii) rendering, by the second application, the version of electric content on a second digital signage device.

4. The method of claim 1, wherein (i) the first peer computing device is a mobile computing device and the first application is configured to render the version of electronic content or (ii) the second peer computing device is a mobile computing device and the second application is configured to render the version of electronic content.

5. The method of claim 1, further comprising receiving a selection of the master computing device from a user of (i) the web management system or (ii) a content delivery system.

6. The method of claim 1, wherein the version of electronic content includes website content from the web management system, the method further comprising
    causing the website content to be displayed on a display of the master computing device.

7. The method of claim 1, further comprising further modifying the version of electronic content based on input received at the master application.

8. The method of claim 1, further comprising:
    receiving additional electronic content from one or more of (i) the first web server or (ii) the second web server; and
    transmitting the modified version of electronic content from the master web server to the web management system by pushing the modified version of electronic content from the master web server to a content repository of the web management system.

9. A system comprising:
    a processor;
    a display device; and
    a memory having instructions stored thereon, that, if executed by the processor, cause the processor to perform operations comprising:
        establishing (i) a first connection between a master web server executing on the system and a web management system across a first data network, (ii) a second connection between the master web server and a first web server executing on a first peer computing device across a second data network, and (iii) a third connection between the master web server and a second web server executing on a second peer computing device across the second data network, wherein the first peer computing device and the second peer computing device are not connected to the first data network;
        receiving, from the web management system across the first data network, a plurality of versions of electronic content;
        selecting, at the master web server, from the plurality of versions of electronic content and based on network conditions of the first data network or the second data network, a version of content; and
        sending, from the master web server, over the second data network to the first web server and to the second web server, the version of electronic content, wherein, when the version of electronic content is received by the first web server, the version of electronic content is simultaneously displayed by (i) the display device and by (ii) a first application executing on the first peer computing device, wherein the first application queries the first web server, and (iii) a second application executing on the second peer computing device, wherein the second application queries the second web server; and responsive to determining, on the master web server, that a user operating the first application has created a modified version of the version of electronic content stored on the first web server:
    receiving, over the second data network at the master web server, the modified version of electronic content from the first peer computing device,
    transmitting, over the second data network, from the master web server to the second peer computing device, the modified version of electronic content, and
    transmitting, over the first data network from the system to the web management system, the modified version of electronic content.

10. The system of claim 9, wherein the instructions, when executed by the processor, further cause the processor to perform operations comprising displaying, on the display device, a user interface usable to select (i) a computing device as a master device, (ii) the first peer computing device, or (iii) the version of electronic content, wherein the version of electronic content includes web content associated with the web management system.

11. The system of claim 9, wherein the version of electronic content includes website content from the web management system; and wherein the instructions, when executed by the processor, further cause the processor to display the website content on the display device.

12. A non-transitory computer readable storage medium having executable instructions stored thereon, that, if executed by a computing device, cause the computing device to perform operations comprising:
    establishing (i) a first connection between a master web server executing on a master computing device and a web management system across a first data network, and (ii) a second connection between the master web server and a first web server executing on a first peer computing device across a second data network, and (iii) a third connection between the master web server and a second web server executing on a second peer computing device across the second data network, wherein the first peer computing device and the second peer computing device are not connected to the first data network;
    receiving, over the first data network, at the master web server, and from the web management system, a plurality of versions of electronic content;
    selecting, at the master web server, from the plurality of versions of electronic content and based on network conditions of the first data network or the second data network, a version of electronic content;
    transmitting, over the second data network, from the master web server to the first web server and the second web server, the version of electronic content, wherein, when the version of electronic content is received by the first web server, the version of electronic content is simultaneously displayed by (i) a master application that executes on the master computing device, wherein the master application queries the master web server, (ii) a first application that executes on the first peer computing device, wherein the first application queries the first web server, and (iii) a second application that executes on the second peer computing device, wherein the second application queries the second web server; and responsive to determining, on the master computing device, that a modification has been made to the version of electronic content by a user operating the first peer computing device:
    receiving, over the second data network, at the master web server, the modified version of electronic content from the first web server,
    transmitting, over the second data network, from the master web server to the second web server, the modified version of electronic content, and
    transmitting, over the first data network, from the master web server to the web management system, the modified version of electronic content.

13. The non-transitory computer readable storage medium of claim 12, wherein the operations further comprise further modifying the modified version of electronic content based on to input received at the master computing device.

14. The non-transitory computer readable storage medium of claim 12, wherein the modified version of electronic content is received from one of (i) the first web server or (ii) the second web server, and the operations further comprise pushing the modified version of electronic content from the master web server to a content repository of the web management system.

15. The method of claim 1, further comprising:
    responsive to determining that the master computing device is unavailable, selecting a new master computing device from a set of additional peer computing devices, the new master computing device comprising a new master web server;
    receiving, at the new master web server, the version of electronic content from the web management system; and
    establishing a fourth connection between the new master web server and the web management system and a fifth connection between the new master computing device and the first and second peer computing devices.

16. The method of claim 1, further comprising:
    receiving, at the master computing device, personal data relating to a user from the first peer computing device;
    sending the personal data from the master web server to the web management system; and
    deleting the personal data from the first peer computing device responsive to determining that the personal data has been received by the web management system.

17. The method of claim 1, further comprising:
    sending, from the master computing device and to the web management system, a location of the first peer computing device to the web management system, wherein the version of electronic content received over the first data network at the master computing device from a web management system is based on the location of the first peer computing device.

18. The system of claim 9, wherein the instructions, when executed by the processor, further cause the processor to perform operations comprising:
    receiving personal data relating to a user from the first peer computing device;
    sending the personal data from the master web server to the web management system; and
    deleting the personal data from the first peer computing device responsive to determining that the personal data has been received by the web management system.

19. The system of claim 9, wherein the instructions, when executed by the processor, further cause the processor to perform operations comprising:

sending a location of the first peer computing device to the web management system, wherein the version of electronic content received over the first data network from a web management system is based on the location of the first peer computing device.

\* \* \* \* \*